Jan. 16, 1923.
R. D. HUNGERFORD.
GRAIN SEPARATOR.
FILED NOV. 3, 1920.
1,442,526
2 SHEETS-SHEET 2
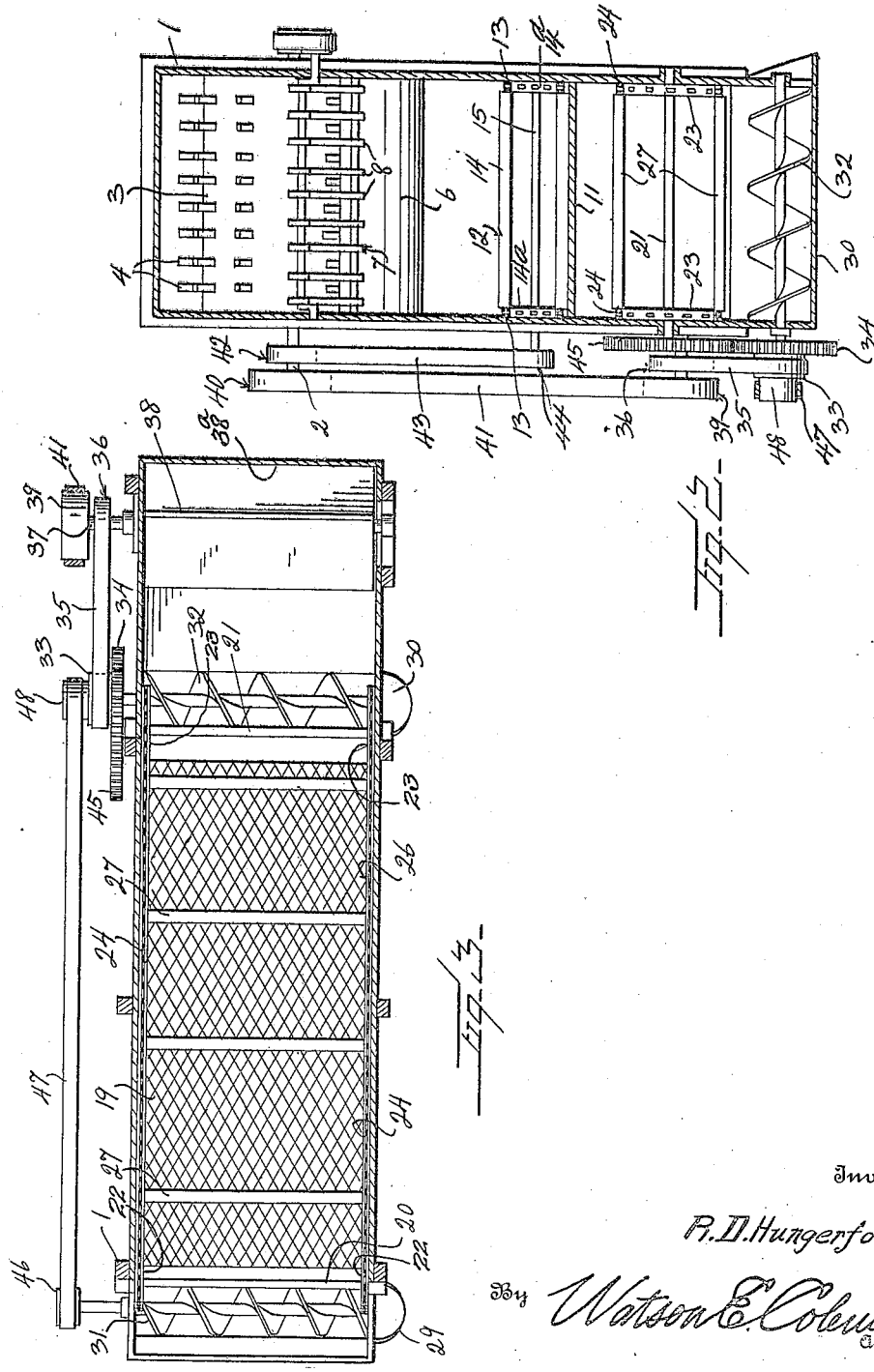
Inventor
R.D.Hungerford
By Watson E. Coleman
Attorney Patented Jan. 16, 1923.

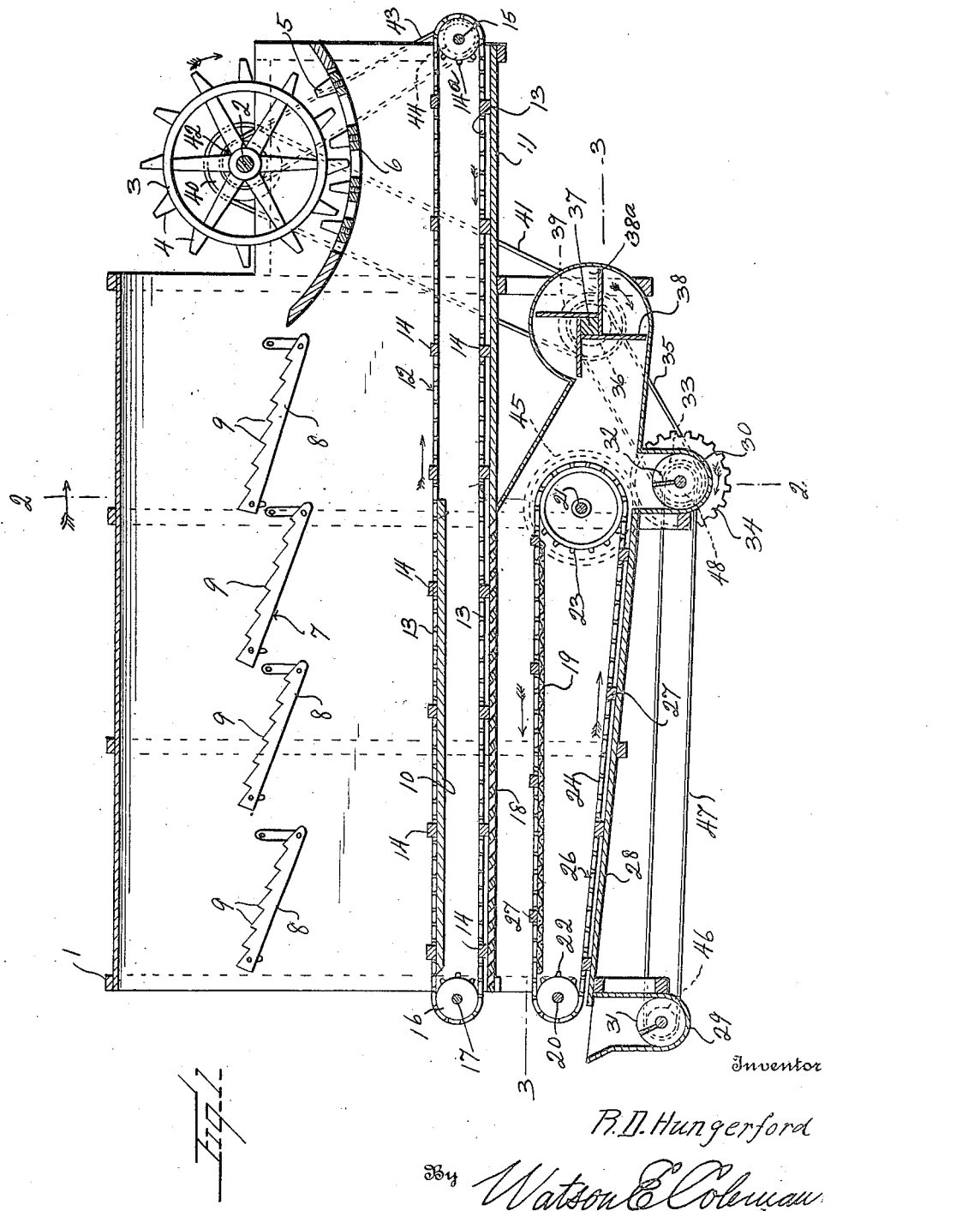

1,442,526

UNITED STATES PATENT OFFICE.

ROLLA D. HUNGERFORD, OF FAXON, OKLAHOMA, ASSIGNOR OF ONE-HALF TO F. O. PETERS, OF FAXON, OKLAHOMA.

GRAIN SEPARATOR.

Application filed November 3, 1920. Serial No. 421,510.

*To all whom it may concern:*

Be it known that I, ROLLA D. HUNGERFORD, a citizen of the United States, residing at Faxon, in the county of Comanche and State of Oklahoma, have invented certain new and useful Improvements in Grain Separators, of which the following is a specification, reference being had to the accompanying drawings.

The purpose of the present invention is to provide a grain separator, wherein the material, such as wheat or the like, is first passed between a rotating cylinder and a concave, in order to separate most of the grain from the straw, the straw passing onward through the machine onto the straw rack, and also wherein the grain as it leaves the concave is carried by a conveyor to and upon a perforated chaffer board, the grain passing therethrough onto a sieve board, the chaff being separated from the grain, the grain being carried over the sieve board and delivered into a lateral screw conveyor.

Another purpose consists in the provision of a flooring under the lower part of a raddle, so that the grain proper, which may pass through the sieve board, is carried in the opposite direction to a lateral screw conveyor, and discharged at the side of the machine, there being means, such as a blower for blowing the chaff from the grain during its passage through the machine.

When the grain is passed between the rotating cylinder and the concave, considerable of the grain is not separated from the straw at the time of such passage of the material, therefore this grain passes on with the straw to the straw rack, and considerable of this grain, during the passage of the straw over the straw rack, automatically separates from the straw and drops through the rack onto a floor board under the rack, whereby a raddle, which operates over said floor board carries the grain proper forward of the machine so that such grain may drop upon a floor board under the lower part of the forward portion of the uppermost raddle. By this arrangement, it is the aim to carry this grain again rearwardly and over the perforated chaffer board, so that the grain may pass through the perforations onto the sieve, the chaff being separated from the grain, and blown from the machine by means of a blower.

A further purpose resides in the provision of a straw rack, wherein members of the rack are inclined upwardly and rearwardly in corresponding planes, and the motion of the straw tumbling from one rack member to another, assisting materially in separating the grain from the straw, so that the grain may be acted upon by the raddles, the chaffer board and the sieve.

A still further object is the provision of a machine of this kind, wherein the separating of various grains may be considerably facilitated.

Additionally, it is the aim to provide a very simple, efficient and practical machine of this kind, wherein improved features, arrangement and combinations of parts, are brought together, whereby a machine of the present kind may be constructed and manufactured for a relatively low cost and sold at a reasonably low profit.

Also it is the aim to provide a machine of this kind for conveying the grain from one part of the machine to the other after it is separated from the straw, and when so conveying the grain the chaff is blown from the grain, thereby doing away with shaking and vibrating means, such as used in machines heretofore employed. Furthermore the present form and construction of machine is much cheaper to build.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a longitudinal sectional view through the improved grain separator constructed in accordance with the invention.

Figure 2 is a vertical sectional view on line 2—2 of Figure 1.

Figure 3 is a horizontal sectional view longitudinally of the machine on line 3—3 of Figure 1.

Referring more especially to the drawings, 1 designates a frame of the machine and 2 denotes a shaft, on which a rotating cylinder 3 is mounted. This cylinder is provided with radial thrashing teeth 4, which cooperate with the teeth 5 of the concave 6, for separating the grain from the straw. The concave 6 comprises a plurality of transverse slots or bars, properly spaced, and through which the grain from the straw passes.

The straw passes on between the concave and the rotating cylinder and forced upon the straw rack 8, which is mounted in the frame. This straw rack comprising a plurality of members 8, which are toothed or ribbed as shown at 9, and are inclined in corresponding planes as shown.

The chamber below the straw rack and the concave are provided with grain floors 10 and 11, the former being arranged to the rear and spaced from the concave, while the latter is disposed forward and under the concave. The floor 11 is disposed in a plane below the floor 10, and traveling through the chamber below the rack and the concave is a raddle or conveyor 12. This raddle or conveyor comprises sprocket chains 13, which are connected by the slats or bars 14. The sprocket chains of the raddle or conveyor pass over the sprocket 14$^a$ of the shaft 15 forward of the concave, and over the sprockets 16 of the shaft 17 at the rear of the chain. The upper part of this raddle or conveyor passes over the grain board 10 at the rear portion of the chain, while the lower portion of the raddle or conveyor passes over the grain board 11.

Extending from the grain board 11 and in the same plane therewith is a perforated chaffer board 18, which is under the lower portion of the raddle or conveyor, and also under the grain board 10.

It will be noted that the grain when separated from the straw and passes through the concave drops upon the floor board 11, and is carried by the raddle or conveyor to and upon the perforated chaffer board.

When a certain amount of the grain is carried further on to the straw rack, the grain passes between the members of the rack, and upon the grain board 10, the straw passing on to the rear of the machine.

Also mounted in the frame is a grain sieve 19, and mounted in bearings of the frame are shafts 20 and 21 having sprockets 22 and 23 which are engaged by the chains 24 of the lower raddle or conveyor 26. The chains 24 are connected by the transverse slats or bars 27, and mounted under the lower part of the raddle or conveyor 24 is a grain board 28.

The frame of the machine is provided with conveyor troughs 29 and 30, which are arranged transversely, and act to deliver the grain to one side of the machine. Rotatably mounted in the troughs 29 and 30 are screw conveyors 31 and 32. Mounted upon the shaft of the screw conveyor 32 is a pulley 33 and a gear 34. The pulley 33 has a belt connection 35 with the pulley 36 on one end of the shaft 37 of the blower 38, which is mounted in the blower chamber 38$^a$ of the frame of the machine. The shaft 37 has an additional pulley 39, which is connected to a pulley 40 of the shaft of the rotating cylinder 3, by means of the belt 41. A second pulley 42 is carried by the shaft of the rotating cylinder 3 and has a belt 43 passing about a pulley 44 carried by the shaft 15 of the raddle at the forward portion of the separator. By this belting means, power is transmitted from the cylinder to the raddle 12, to the blower, and to the screw conveyors, so as to impart motion to these various moving parts of the separator. The shaft 21 carries a gear 45, which meshes with the gear 34, so that power may be transmitted to the raddle or conveyor 24. The shaft of the screw conveyor 31 has a pulley 46, which is engaged by a belt 47, which passes from a pulley 48, carried by the shaft of the forward screw conveyor 32.

The grain proper that is not separated from the straw during its passage between the rotating cylinder and the concave, passes between the members 8 of the straw rack, and falls upon the grain board 10, it being carried forward and deposited upon the lower grain board 11, hence practically all of the grain proper from the straw is conveyed to the perforated chaffer board 18. The grain from the chaffer board falls upon the grain sieve 19, and it will be noted that some of the grain is carried forwardly and discharged or deposited in the screw conveyor trough at the forward portion of the machine. The grain which is not carried forward by the raddle or conveyor 26, passes through the sieve and upon the grain board 28, so that the lower portion of the raddle will carry the grain to the rear and deposit it in the conveyor trough 29. The two screw conveyors act to carry the grain proper to and deposit it upon the side of the machine.

The invention having been set forth, what is claimed as being useful is:—

1. In a grain separating machine having grain and straw separating means, comprising a frame, a conveyor below the grain and straw separating means and extending the full length of the frame and comprising upper and lower horizontal parallel laps, an imperforated grain floor over and with the upper surface of which substantially one-half of the forward part of the upper lap of the conveyor engages, a second grain floor below and over and with the upper surface of which substantially the entire lower lap of said conveyor engages, the second grain board having imperforated and perforated sections, the former being offset from the first grain board and in the rear of the frame, the former spaced below the first grain board, whereby the grain upon said first named grain board may be conveyed and deposited upon the imperforated section of the second grain board, and then carried to and permitted to separate upon the perforated section of the second grain board, lateral conveyors at opposite ends of the frame, a conveyor parallel to the first conveyor and having grain sieving means and a third grain board for carrying the separated grain to the respective laterally disposed conveyors, and means for blowing the chaff from the grain as it passes through the perforated section of the second grain board.

2. In a grain separating machine having grain and straw separating means, comprising a frame, a grain board at one end of the frame, a second grain board horizontally parallel with the first board and having imperforated and perforated sections, the latter section being spaced below the first grain board, a horizontal conveyor extending substantially the full length of the frame and having its upper and lower laps traveling over and in engagement with the upper surfaces of both grain boards, a pneumatic blower below the imperforated section and discharging its blast in a direction toward the perforated section of the second grain board, the perforations of the second gain board being inclined downwardly and toward the blast from the blower, whereby the blast may blow the chaff from the seed to prevent the chaff from passing through said perforations.

3. In a grain separating machine having grain and straw separating means, comprising a frame, a grain board at one end of the frame, a second grain board horizontally parallel with the first board and having imperforated and perforated sections, the latter section being spaced below the first grain board, a horizontal conveyor extending substantially the full length of the frame and having its upper and lower laps traveling over and in engagement with the upper surfaces of both grain boards, a pneumatic blower below the imperforated section and discharging its blast in a direction toward the perforated section of the second grain board, the perforations of the second grain board being inclined downwardly and toward the blast from the blower, whereby the blast may blow the chaff from the seed to prevent the chaff from passing through said perforations, lateral discharging conveyors at opposite ends of the frame, and additional grain separating means connecting the lateral discharging conveyors and operating below the perforated section, said additional grain separating means also being in the path of the blast from the blower, to permit the grain to be additionally cleaned.

In testimony whereof I hereunto affix my signature.

ROLLA D. HUNGERFORD.